(12) United States Patent
Addifetti

(10) Patent No.: US 11,439,066 B2
(45) Date of Patent: Sep. 13, 2022

(54) LENGTH-VARIABLE AND PITCH-ADJUSTABLE WHEELBASE COMBINE

(71) Applicant: AGCO International GmbH, Neuhausen (CH)

(72) Inventor: Alessio Addifetti, Breganze (IT)

(73) Assignee: AGCO International GmbH, Neuhausen (CH)

( * ) Notice: Subject to any disclaimer, the term of this patent is extended or adjusted under 35 U.S.C. 154(b) by 303 days.

(21) Appl. No.: 16/750,493

(22) Filed: Jan. 23, 2020

(65) Prior Publication Data

US 2020/0236852 A1 Jul. 30, 2020

(30) Foreign Application Priority Data

Jan. 25, 2019 (GB) .................................... 1901045

(51) Int. Cl.
| | |
|---|---|
| *A01D 67/00* | (2006.01) |
| *B62D 49/06* | (2006.01) |
| *B60B 35/10* | (2006.01) |
| *A01D 75/28* | (2006.01) |

(52) U.S. Cl.
CPC ............. *A01D 67/00* (2013.01); *A01D 75/28* (2013.01); *B62D 49/0678* (2013.01); *B60B 35/1036* (2013.01); *B60G 2300/40* (2013.01)

(58) Field of Classification Search
CPC .... A01D 75/287; A01D 75/285; A01D 41/14; A01D 41/06; A01D 67/00; B60B 35/1054; B60G 2200/44; B60G 2202/413; B60G 2300/40; B62D 49/0678; B60Y 2200/222
See application file for complete search history.

(56) References Cited

U.S. PATENT DOCUMENTS

| | | | | |
|---|---|---|---|---|
| 2,796,717 A * | 6/1957 | Orelind | ................ | A01D 75/285 180/41 |
| 4,204,697 A * | 5/1980 | Santerre | ............... | B62D 63/065 280/149.2 |
| 4,639,008 A * | 1/1987 | Krettenauer | ......... | B62D 53/028 172/247 |
| 5,368,121 A | 11/1994 | Preifert | | |
| 6,065,556 A * | 5/2000 | Andrews | ............ | B62D 49/0678 180/209 |
| 6,416,136 B1* | 7/2002 | Smith | .................. | B60B 35/003 301/124.1 |
| 7,780,197 B2* | 8/2010 | White | ................ | B62D 49/0657 280/781 |

(Continued)

FOREIGN PATENT DOCUMENTS

GB     1173920 A     12/1969

OTHER PUBLICATIONS

UK Intellectual Property Office, Search Report for UK Priority Application No. GB1901045.3, dated Jul. 18, 2019.

*Primary Examiner* — Alicia Torres

(57) ABSTRACT

A combine harvester with a variable length wheelbase. For example, a combine harvester may have a chassis defining a forward end and a rear end, a feeder house at the forward end of the chassis, a first set of ground-engaging elements supporting the forward end of the chassis, and a second set of ground-engaging elements supporting the rear end of the chassis. The second set of ground-engaging elements are configured to move forward and rearward relative to the chassis.

9 Claims, 7 Drawing Sheets

(56) References Cited

U.S. PATENT DOCUMENTS

| | | | | |
|---|---|---|---|---|
| 8,348,001 | B2* | 1/2013 | Isfort | B62D 55/04 |
| | | | | 180/209 |
| 9,226,448 | B2* | 1/2016 | Wright | B62D 49/0678 |
| 9,308,939 | B2* | 4/2016 | Osswald | E02F 9/2004 |
| 2004/0255563 | A1 | 12/2004 | Schafer | |
| 2009/0206589 | A1 | 8/2009 | Osswalo et al. | |
| 2013/0049316 | A1 | 2/2013 | Schwinn et al. | |
| 2014/0260158 | A1* | 9/2014 | Nelson | B60B 35/1063 |
| | | | | 56/16.7 |
| 2017/0274704 | A1* | 9/2017 | Fay, II | B62D 49/0678 |
| 2021/0185883 | A1* | 6/2021 | Breure | B62D 49/0678 |

* cited by examiner

Prior Art

Prior Art

LENGTH-VARIABLE AND PITCH-ADJUSTABLE WHEELBASE COMBINE

CROSS-REFERENCE TO RELATED APPLICATION

This application claims the benefit of the filing date of U.K. Patent Application GB1901045.3, filed Jan. 25, 2019, the entire disclosure of which is incorporated herein by reference.

FIELD

The present disclosure relates to a combine harvester. In particular, the disclosure relates to a combine harvester having a variable wheelbase length.

BACKGROUND

The wheelbase of a vehicle is commonly understood to at least partially define the handling characteristics of that vehicle. Wheelbase length is typically a consideration when designing a car. Considering a typical 4-wheeled car, a car with a short wheelbase is commonly understood to be more nimble and able to steer more readily and sharply than a vehicle with a long wheelbase. Conversely, a vehicle with a longer wheelbase is more stable at speed and will feel more comfortable as it rides better over bumps. Accordingly, it would be advantageous to have a car with a wheelbase that is variable so as to produce most advantages at different vehicle speeds—for example, a short wheelbase at low speed or when cornering, and a longer wheelbase when at higher speed or when comfort is more of a priority. However, it is rarely practical to alter the physical wheel layout of a car, which is why systems such as four-wheel steer have been developed which allow a 'virtual' wheelbase length change, enabled by, for example, the rear wheels steering in the opposite direction to the front wheels at low speed and steering in the same direction (but at a smaller angle) as the front wheels when at a higher speed, thus altering the effective wheelbase length of the vehicle.

Combine harvesters are typically large machines that often have a pair of large fixed driving wheels (or tracks) towards the front of the machine, and a pair of smaller, steering wheels towards the back of the machine. Combine harvesters are not required to travel at speed, and nimble handling is also not a standard requirement, and so the normal expected advantages of a variable wheelbase are not typically required. However, a large machine such as a combine harvester may, in some circumstances, such as a small farmyard, benefit from a smaller turning circle. Also, although a combine harvester is not required to travel at high speed, there is an advantage to a longer wheelbase when harvesting, as when harvesting a combine is usually required to drive in a straight line for extended periods of time, and so a stable platform is advantageous. Also, a longer wheelbase may provide a more comfortable ride for a combine occupant.

BRIEF SUMMARY

Accordingly, there is provided a combine harvester with a variable length wheelbase. As the front wheels of a combine are usually larger and on a fixed axle surrounded by, for example, a header unit in front of the front wheels and axle, and various complex mechanisms behind the front axle, these are difficult to make movable. Accordingly it is advantageous if the rear wheels of the combine are constructed and arranged to be operably movable forward or rearward relative to the main body of the combine.

In some embodiments, the combine harvester comprises a rear steering axle bar. The axle bar may be mounted on a longitudinal member protruding rearwards from the main body of the combine harvester. In certain embodiments, the longitudinal member is a cylindrical bar. The rear axle bar may be free to rotate around the longitudinal member, which member may act as a pivot mounting. Advantageously this may allow for compensatory up and down movement of the rear steering wheels on either side; as the left hand wheel goes up or down depending on local ground perturbations, the right hand wheel is allowed to go alternately down or up correspondingly.

In some embodiments, the rear steering axle bar is able to operably move forward and rearward along the longitudinal member. There may be provided an actuator to control the forward and rearward movement of the steering axle bar along the longitudinal member. The actuator may be a hydraulic or pneumatic cylinder or may comprise an electromechanical servo device. The actuator may be generally longitudinal and attached at one end to the main body of the combine harvester (or other machine), or a suspension member, and at the other end to the steering axle. In certain embodiments, the actuator may be generally longitudinal and attached at one end to the steering axle and at the other end to a suspension element of a suspension assembly of the machine or vehicle or combine harvester. In some embodiments, the actuator is located above the longitudinal member.

In other embodiments, the combine harvester may include a pitch control system. The pitch control system may have a pitch actuator (hydraulic or pneumatic cylinder or electromechanical servo device) fitted between the main body or chassis of the machine/combine and an element of a suspension assembly. The element may be a swing arm. The swing arm may connect a suspension element to the chassis or main body of the machine/combine harvester.

BRIEF DESCRIPTION OF THE DRAWINGS

The drawings are briefly described below.

DETAILED DESCRIPTION

Figure 1:
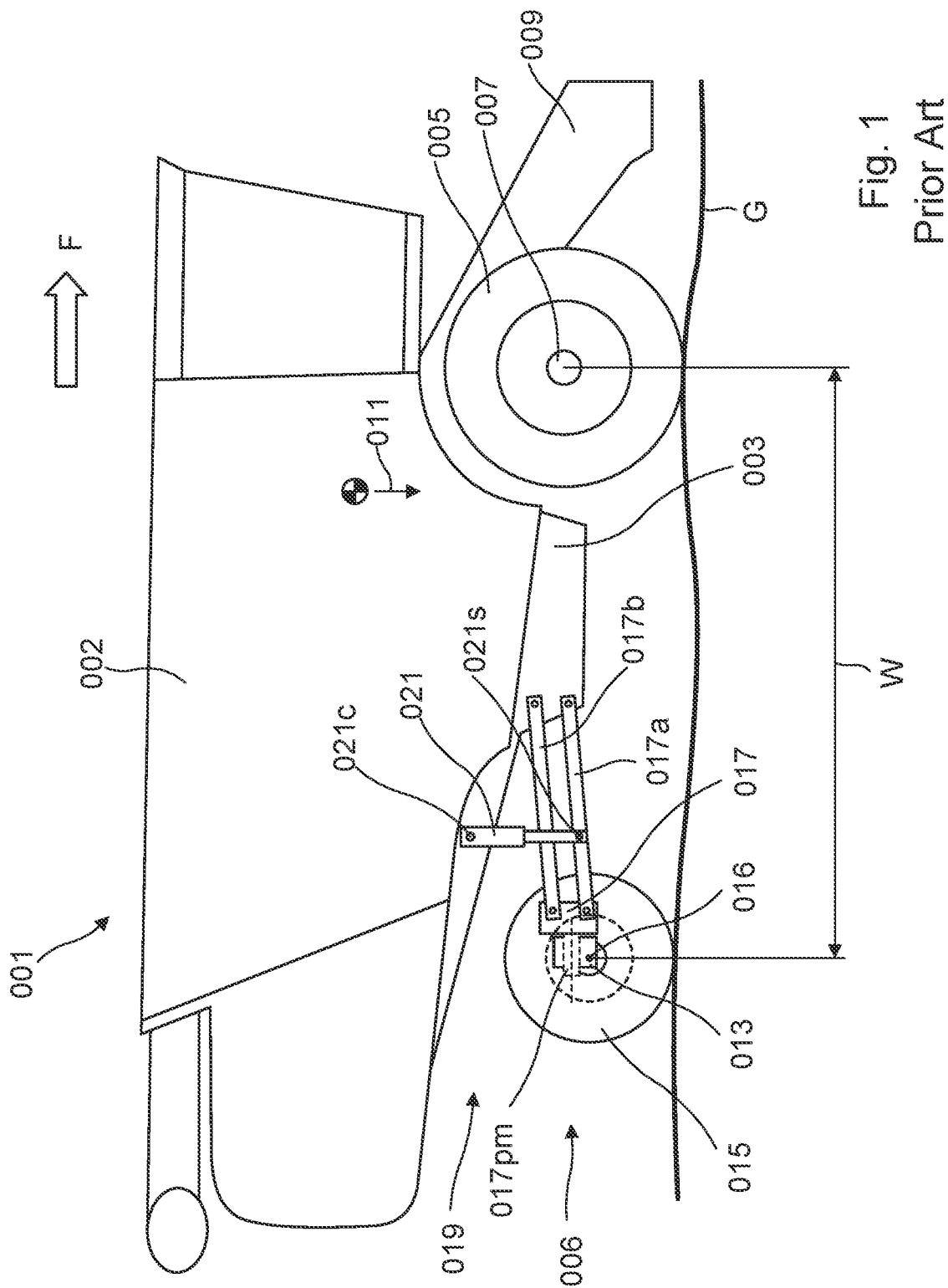
FIG. 1 shows a schematic side view of a typical layout of a prior art combine harvester.
Figure 2:
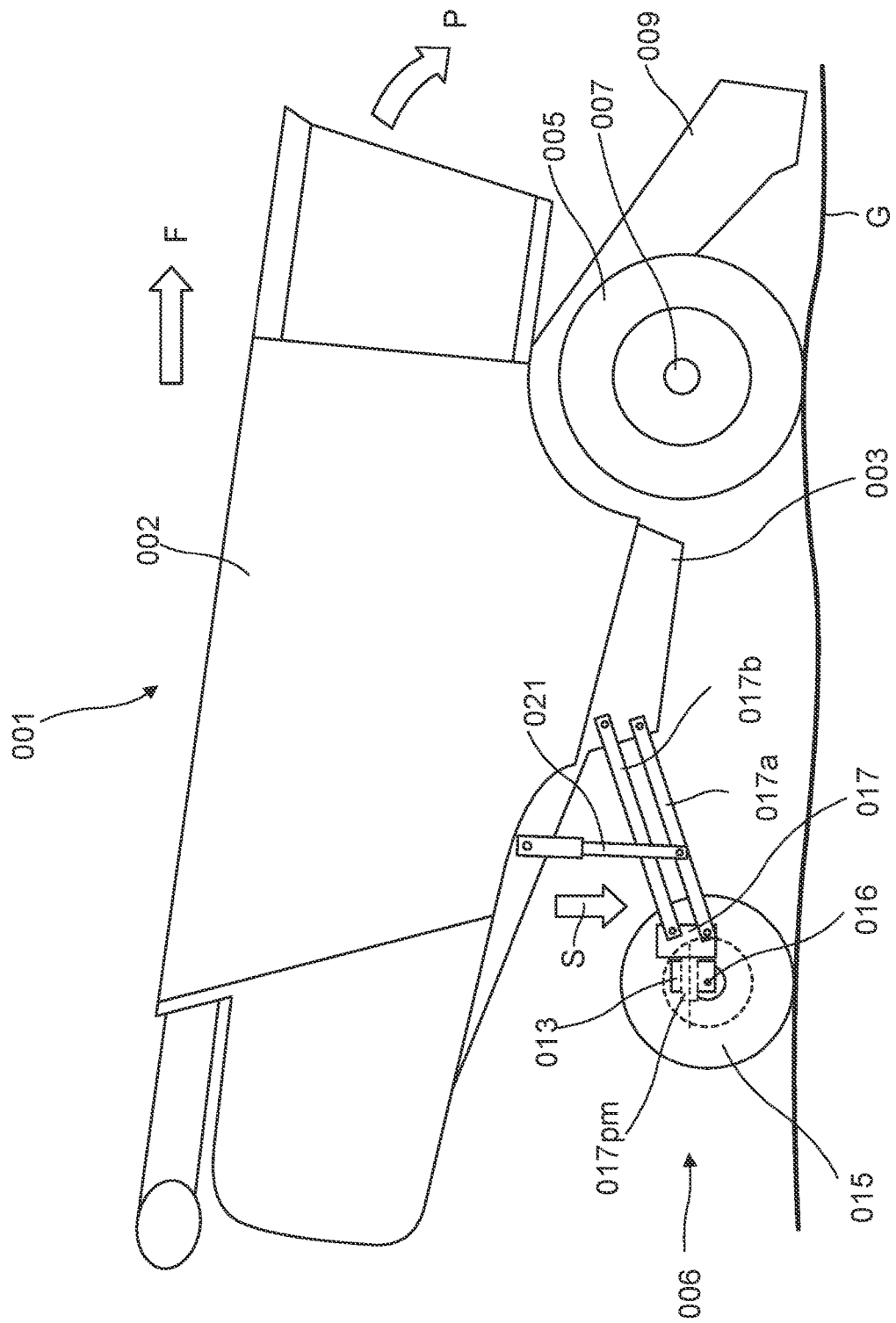
FIG. 2 shows a schematic side view of a typical layout of a prior art combine harvester.

FIGS. 1 and 2 show a schematic side view of a layout of a combine harvester 001. References to forward, rearward (i.e., backward), left, right, up and down are in relation to the shown arrow F, which defines the normal forward direction of travel of the combine when in use. It will be understood that various elements of which only one can be seen may in fact be in pairs—for example, rear wheel(s) 015. The skilled person will readily understand the arrangement of omitted elements.

Combine harvester 001 has a main body 002 and a chassis 003 to which are mounted a pair of large front wheels/tires 005 on fixed axles 007. Within the main body 002 of the combine harvester 001 are a number of harvesting systems such as a thresher, cleaning shoe, etc., which, with a header attached to the feeder house 009 at the front of the combine harvester 001, give the combine harvester 001 a center of gravity (COG) acting downward in the direction of arrow 011. Due to the location of the harvesting systems and the header, the COG is normally near the front of the machine, relatively close behind the front wheels 005. Accordingly the front wheels/tires 005 are typically large, both to cope with the load and also to spread the load on them over as large a surface area as possible so as to limit or minimize soil compaction. On some particularly large and heavy machines, the wheels/tires may be replaced with tracks. Towards the rear of the machine is a suspension assembly 006, which typically includes an axle bar 013 on which is mounted steerable rear wheels 015. This axle bar 013 is rotatably mounted on a longitudinal cylindrical pivot mount 017pm which is fixed to a suspension element 017. The pivot mounting of the axle bar 013 on the pivot mount 017pm allows compensatory up-and-down movement of the rear wheels 015 on either side: as the left hand wheel goes up or down depending on local ground perturbations, the right hand wheel is allowed to go alternately down or up correspondingly. The suspension element 017 is connected to the chassis 003 of the machine by upper and lower suspension swing arms 017a and 017b. Also provided is a pair of hydraulic rams 021 with an upper end mounted to the chassis 003 at a pivot point 021c and a lower end mounted to the lower of the suspension swing arms 017a at a pivot point 021s. FIG. 1 shows that in general, behind the combine harvester 001 is a relatively 'open space' 019, and thus little to prevent, from a structural point of view, the mounting of suspension element 017, axle bar 013 and wheels 015 further back. However, for purposes of maneuverability of the combine harvester 001, the subframe and rear wheels 015 tend to be located closer to the front wheels 005. The wheelbase of the combine harvester 001, which is the longitudinal distance W between the front wheel axle 007 and the nominal rear wheel axle 016, is therefore usually as short as possible. As can be seen in FIG. 2, extension of the hydraulic rams 021 pushes the suspension assembly 006 downwards relative to the combine harvester 001 in the direction of arrow S, which on approximately level ground, such as that ground G shown in FIGS. 1 and 2, results in the combine harvester 001 pitching forward in the direction of arrow P. In practice, as would be understood by the skilled person, the hydraulic rams 021 are used to keep the main body 002 and chassis 003 of the combine harvester 001 level when the combine harvester 001 is travelling forward up a slope, so as to maintain the working attitude of the internal harvesting systems.

Figure 3:
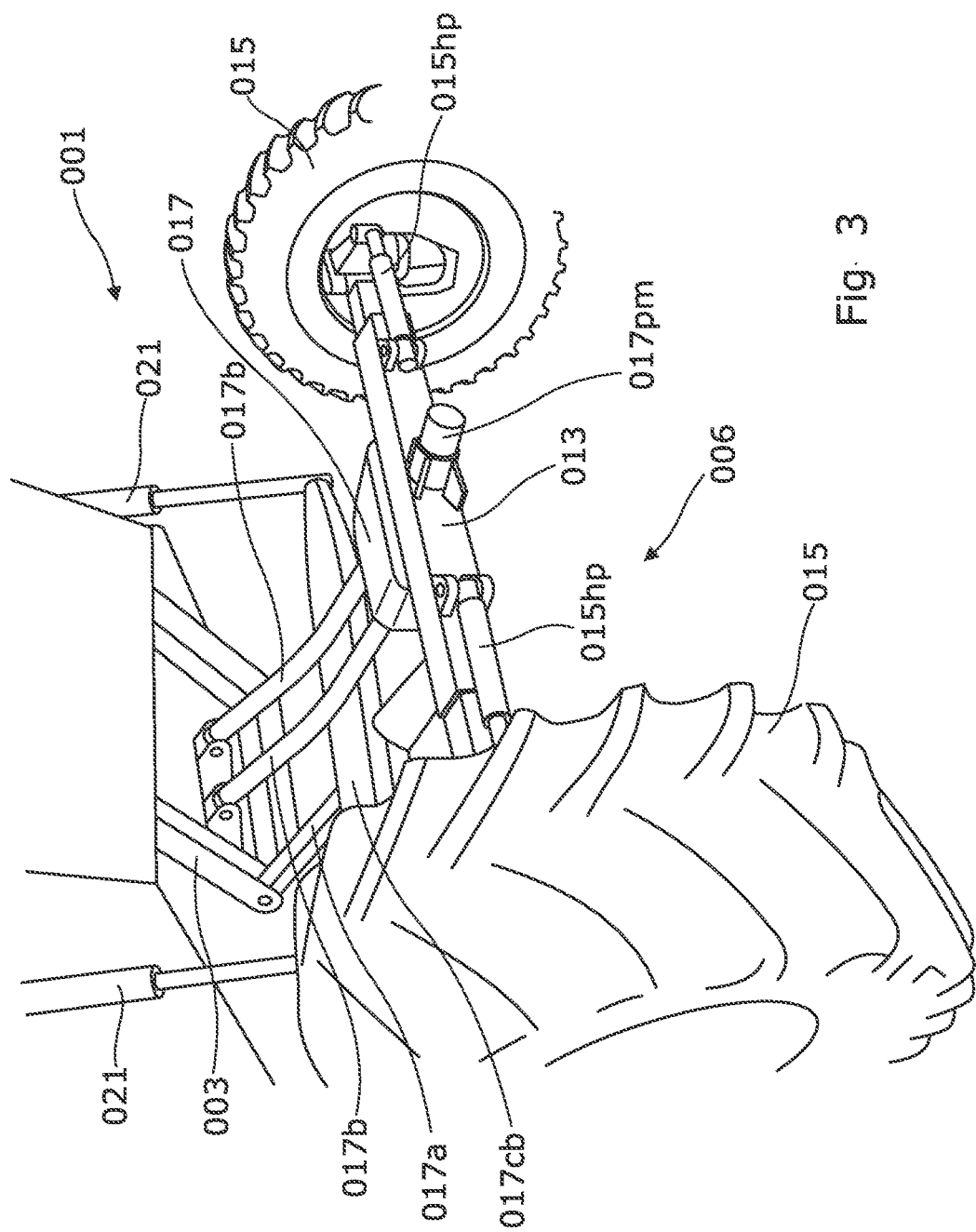
FIG. 3 shows the rear of a combine harvester in 'pitched forward' orientation.
Figure 4:
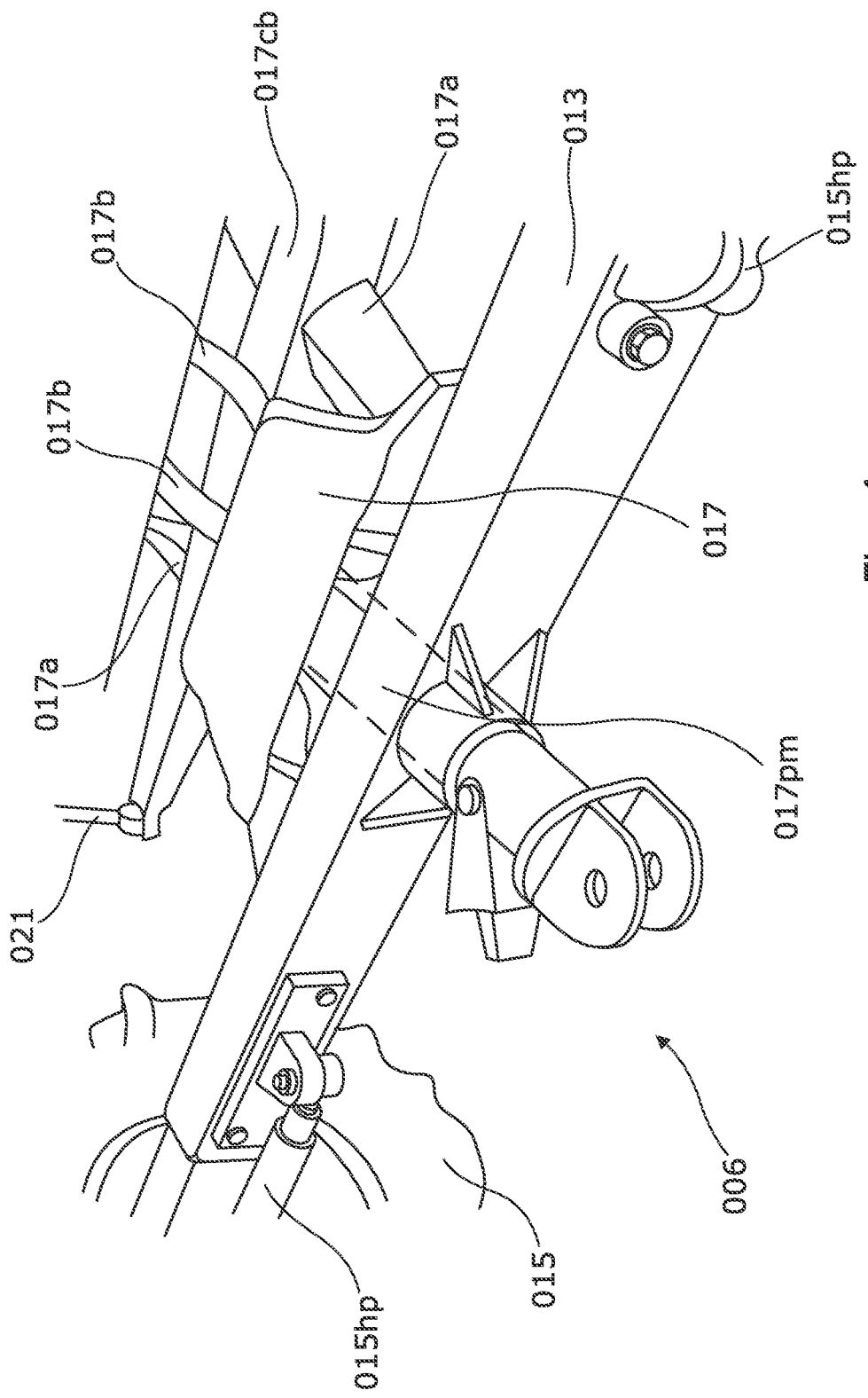
FIG. 4 shows further close-up details of FIG. 3.

FIGS. 3 and 4 show details of a combine harvester embodiment in accordance with the combine harvester 001 described in FIGS. 1 and 2, with like components numbered in a like manner. FIG. 3 shows the rear of a combine harvester in 'pitched forward' orientation, with cylinders 021 extended. Further hydraulic pistons 015hp for steering the rear wheels 015 can be seen mounted on axle bar 013. Pivot mount 017pm is shown in FIG. 3, but would normally be covered by other items that are omitted for clarity. Cylinders 021 may be seen to be joined to each other and to the lower suspension swing arms 017a by lateral crossbar 017cb. FIG. 4 shows further close-up detail of the suspension element 017 and the axle bar 013, which is mounted on the longitudinal pivot mount member 017pm (seen in part represented by dotted lines).

Figure 5A:
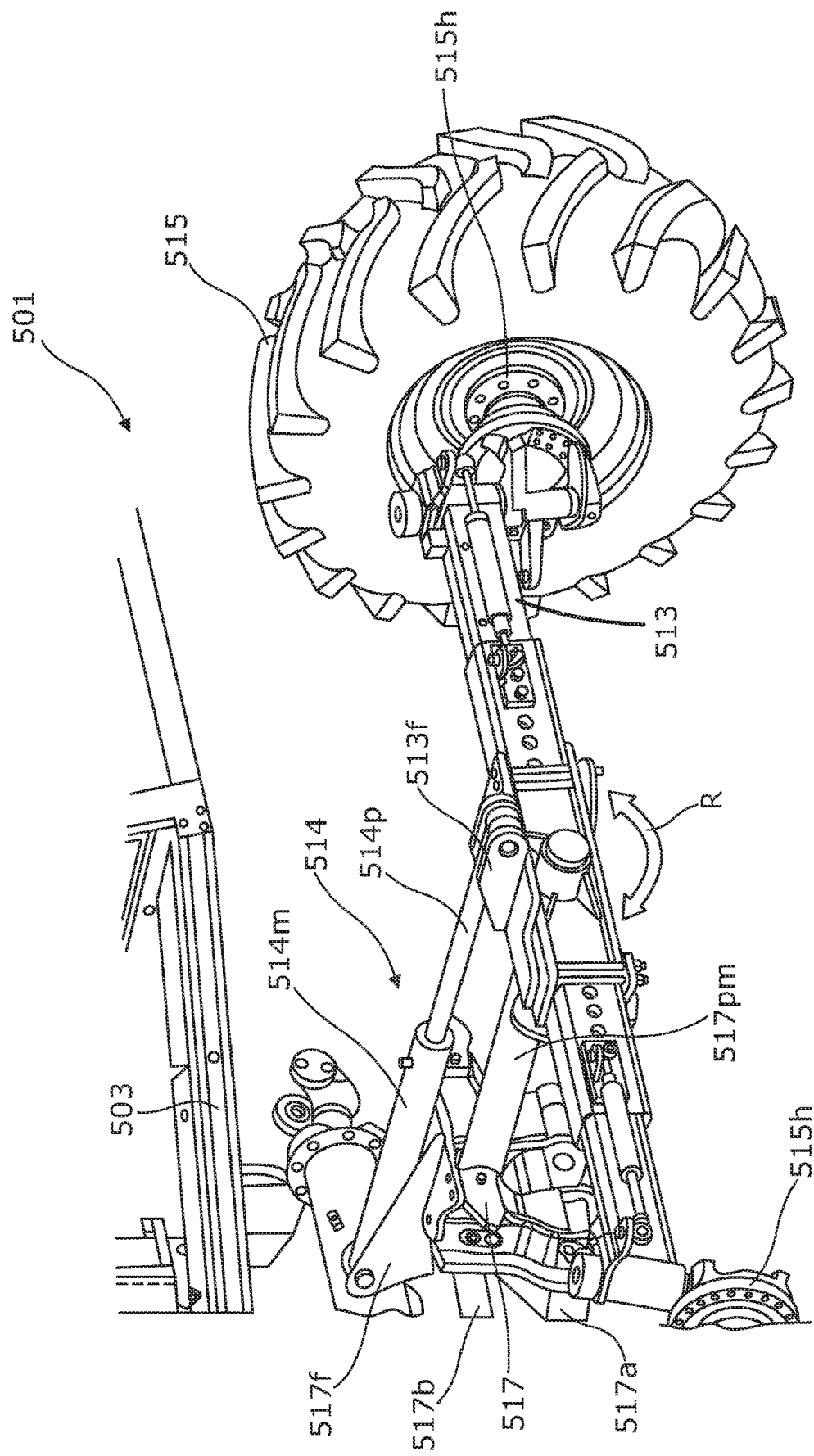
FIG. 5A shows an embodiment in accordance with aspects of the present application.

FIG. 5A shows a partial view of a rear portion of a combine harvester 501.

Rear steering axle bar 513 is mounted on cylindrical longitudinal pivot member 517pm, which protrudes from suspension element 517, which is connected in turn to the chassis 503 of a combine harvester 501 by means of lower and upper suspension arms 517a and 517b. Axle bar 513 is able to slide along pivot member 517pm forward and rearward in the longitudinal direction. Also provided is an actuator 514 having a main body 514m and a piston 514p. The main body 514m is attached to the suspension element 517 at flanges 517f, and the distal end of piston 514p is attached to the axle bar 513 at flanges 513f. Accordingly, the axle bar 513 can be operably moved forward and rearward along the longitudinal pivot member 517pm by operation of the actuator 514, thus altering the wheelbase length of the combine harvester 501. Further, due to the mounting on the pivot member 517pm of the axle bar 513, the axle bar 513 is able to rotate around the longitudinal axis of the cylindrical pivot member 517pm, as illustrated by double-headed arrow R. This provides a degree of suspension to the system as the wheels 515 (only the right-hand-side wheel shown here but part of both wheel hubs 515h visible) move up and down in opposition to each other around the pivot point defined by the mounting of the axle bar 513 on the pivot member 517pm.

Due to the vertical displacement of the actuator piston 514 above the resultant pivot point of the axle bar 513 on the pivot member 517pm, and its mounting at flanges 513f and 517f, the piston 514 acts to resist the pivoting of the axle bar 513 about the pivot member 517pm. Advantageously, the piston 514 can be mounted to the flanges 517f and 513f, or one or other of these flanges, with rubber or silicone bushes. Accordingly, the amount of 'twist' that the axle bar 513 is able to undergo around pivot member 517pm can be both enabled and limited by appropriate selection of such bushes, which may then also act as damping units for the suspension movement. In an alternative embodiment, the actuator 514 may be mounted on one or both of the suspension member 517 and axle bar 513 by means of pivot mountings allowing movement around a vertical axis. In an embodiment, the shown actuator 514 may be mounted to the flanges 517f and 513f with spherical joints.

Figure 5B:
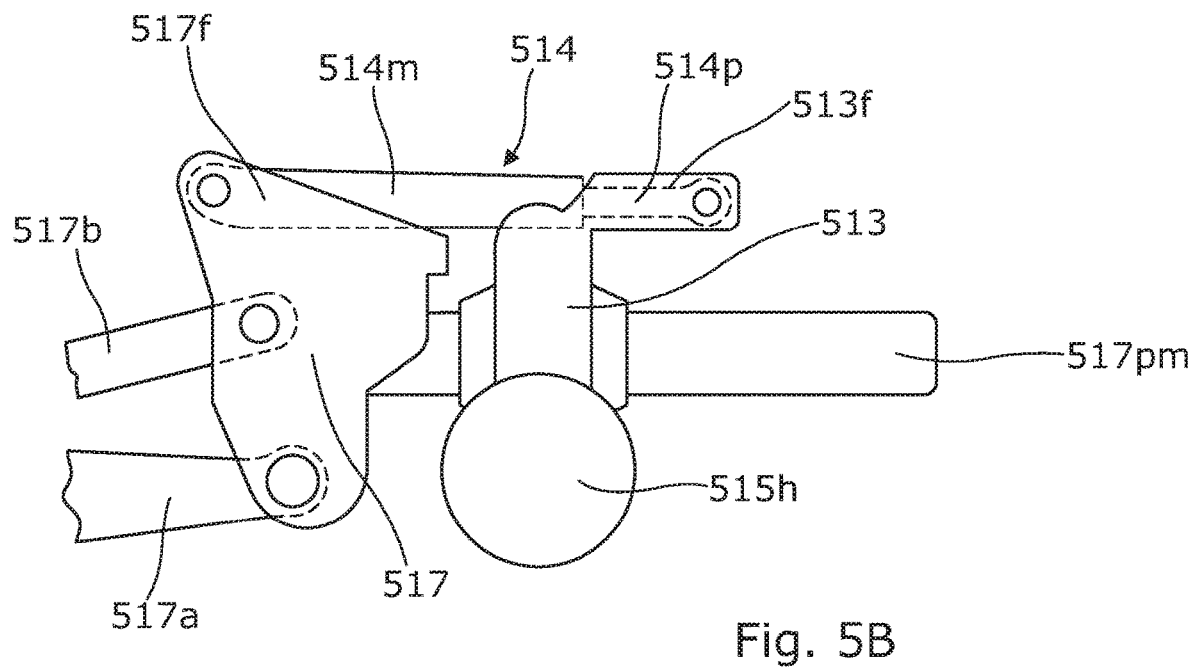
FIGS. 5B and 5C show alternate side views of the embodiment shown in FIG. 5A.
Figure 5C:
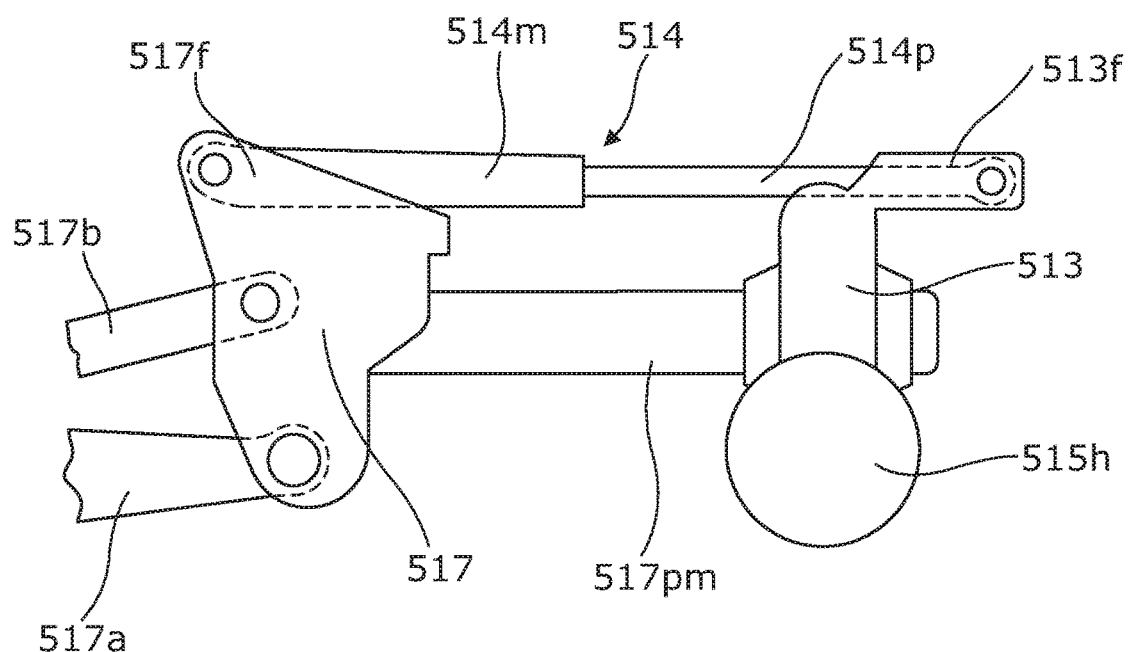

FIGS. 5B and 5C show the same embodiment as in FIG. 5A, but in simplified schematic form and as side views. The wheel 515 is omitted from FIGS. 5B and 5C for clarity, with only the hub 515h on which the wheel 515 is mounted being visible. FIG. 5B shows the axle bar 513 at its closest point to suspension member 517 when the actuator 514 is fully retracted. FIG. 5C shows the axle bar 513 at its furthest point rearward along longitudinal pivot member 517pm when the actuator 514 is at its maximum extension, and thus the wheelbase W (FIG. 1) of a combine harvester 501 to which the suspension assembly was fitted would be extended to its maximum. Also visible in FIGS. 5B and 5C are parts of lower and upper suspension swing arms 517a and 517b, which connect suspension member 517 to the main chassis 503 of the combine in the same way as swing arms 017a and 017b of FIGS. 1 through 4.

Figure 6:
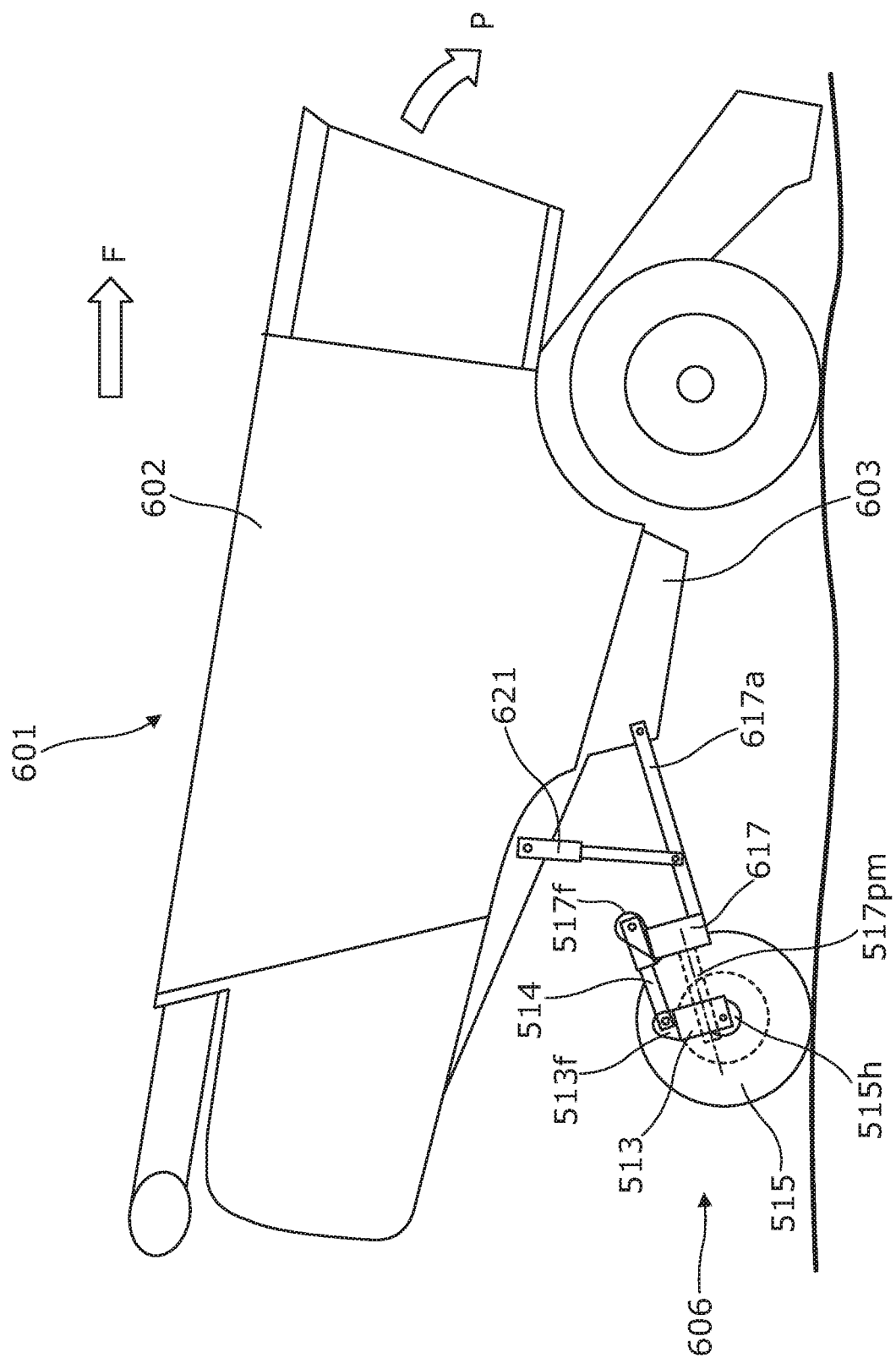
FIG. 6 shows an embodiment with an extendable wheelbase.

An advantage of an embodiment of the extendable wheelbase is illustrated in FIG. 6. As in FIG. 2, the combine of FIG. 6 is provided with a longitudinal pitch control system comprising a pitch actuator 621 which is capable of moving the suspension assembly 606 up and down relative to the main body 602 and chassis 603 of the combine 601. This enables the pitch of the combine 601 to remain constant when the combine is moving up (or potentially down) a slope. FIG. 6 shows the longitudinal pitch control system in conjunction with a wheelbase length varying system similar to that shown in FIGS. 5A to 5C, although with only a single swing arm 617*a* to which suspension member 617 is fixedly attached, rather than with two swing arms (pivotally attached to the suspension member) as FIGS. 1 through 5C. If the actuator 621 (equivalent to 021 in FIGS. 1 through 4) is extended to its fullest in this embodiment, the additional activation of actuator 514 so that axle bar 513 is at its furthest point along cylindrical longitudinal pivot member 517*pm* will result in a yet further raising of the rear end of the combine. Advantageously therefore, the use of a variable wheelbase system in accordance with aspects of the present application can also increase the operable range of a pitch control system of a combine harvester.

The disclosure may be understood further in relation to the following example embodiments:

Embodiment 1

A combine harvester with a variable length wheelbase.

Embodiment 2

A combine harvester as described in Embodiment 1, wherein the combine harvester is provided with a main body and a pair of rear wheels and the rear wheels are constructed and arranged to be operably moved forward or rearward relative to the main body of the combine.

Embodiment 3

A combine harvester as described in Embodiment 2, wherein the combine harvester comprises a rear axle bar mounted on a longitudinal member protruding rearwards from the main body, the rear wheels being mounted on said rear axle bar.

Embodiment 4

A combine harvester as described in Embodiment 3, wherein the rear axle bar is able to operably move forward and rearward along the longitudinal member.

Embodiment 5

A combine harvester as described in Embodiment 3 or Embodiment 4, wherein the longitudinal member is a cylindrical bar.

Embodiment 6

A combine harvester as described in Embodiment 5, wherein the rear wheels comprise a left wheel and a right wheel and the longitudinal member is a pivot mount on which the rear axle bar is mounted, to allow rotation of the axle bar around the longitudinal member, such that as the left wheel goes up or down, the right wheel goes correspondingly down or up.

Embodiment 7

A combine harvester as described in any of Embodiment 3 through Embodiment 6, wherein there is provided an actuator to control the forward and rearward movement of the rear axle bar along the longitudinal member.

Embodiment 8

A combine harvester as described in Embodiment 7, wherein the actuator is a generally longitudinal hydraulic or pneumatic actuator with a first end and a second end.

Embodiment 9

A combine harvester as described in any of Embodiment 3 through Embodiment 8, wherein the longitudinal member is fixedly mounted on a suspension element.

Embodiment 10

A combine harvester as described in Embodiment 9, wherein the actuator has the first end fixed to the suspension element and the second end fixed to the axle bar.

Embodiment 11

A combine harvester as described in any of Embodiment 7 through Embodiment 10, wherein the actuator is mounted above the longitudinal member.

Embodiment 12

A combine harvester as described in any of Embodiment 7 through Embodiment 11, wherein the actuator is fixed at one or both ends by means of a spherical joint.

Embodiment 13

A combine harvester as described in Embodiment 9 or Embodiment 10, wherein there is provided a pitch control actuator arranged and configured to operably move the suspension element up and down relative to the main body.

Embodiment 14

A combine harvester as described in Embodiment 9, Embodiment 10, or Embodiment 13, wherein the suspension element is joined to a chassis of the combine harvester by one or more swing arms.

Embodiment 15

A combine harvester, comprising a chassis defining a forward end and a rear end, a feeder house at the forward end of the chassis, a first set of ground-engaging elements supporting the forward end of the chassis, and a second set of ground-engaging elements supporting the rear end of the chassis. The second set of ground-engaging elements are configured to move forward and rearward relative to the chassis.

Embodiment 16

The combine harvester of Embodiment 15, further comprising a rear axle bar mounted on a longitudinal member protruding rearward from the chassis, wherein the second set of ground-engaging elements is mounted on the rear axle bar.

Embodiment 17

The combine harvester of Embodiment 16, wherein the rear axle bar is configured to move forward and rearward along the longitudinal member.

Embodiment 18

The combine harvester of Embodiment 16 or Embodiment 17, wherein the longitudinal member comprises a cylindrical bar.

Embodiment 19

The combine harvester of any of Embodiment 16 through Embodiment 18, further comprising an actuator configured to control the forward and rearward movement of the rear axle bar along the longitudinal member.

Embodiment 20

The combine harvester of any of Embodiment 15 through Embodiment 19, wherein the first set of ground-engaging elements comprises at least two front wheels, and wherein the second set of ground-engaging elements comprises at least two rear wheels.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventor. Further, embodiments of the disclosure have utility with different and various machine types and configurations

The invention claimed is:

1. A combine harvester comprising:
a variable length wheelbase;
a main body;
a pair of rear wheels configured to move forward and rearward relative to the main body;
a rear axle bar mounted on a longitudinal member protruding rearward from the main body, wherein the pair of rear wheels is mounted on the rear axle bar, wherein the longitudinal member is fixedly mounted on a suspension element;
a wheelbase extension actuator, wherein a first end of the actuator is fixed to the suspension element and a second end of the wheelbase extension actuator is fixed to the rear axle bar so that actuation of the wheelbase extension actuator moves the pair of rear wheels forward and rearward relative to the main body; and
a pitch control actuator configured to pivot the suspension element up and down relative to the main body to alter a pitch measurement of the main body, wherein when the pitch control actuator is extended to its fullest to alter the pitch measurement, activation of the wheelbase extension actuator results in further pivoting of the suspension element to further alter the pitch measurement of the main body.

2. The combine harvester of claim 1, wherein the rear axle bar is configured to move forward and rearward along the longitudinal member.

3. The combine harvester of claim 1, wherein the longitudinal member comprises a cylindrical bar.

4. The combine harvester of claim 3, wherein the pair of rear wheels comprises a left wheel and a right wheel, and wherein the longitudinal member comprises a pivot mount on which the rear axle bar is mounted to allow rotation of the rear axle bar around the longitudinal member, such that as the left wheel travels up or down, the right wheel travels correspondingly down or up in a direction opposite the left wheel.

5. The combine harvester of claim 1, wherein the wheelbase extension actuator comprises a longitudinal hydraulic or pneumatic actuator comprising a first end and a second end.

6. A combine harvester comprising:
a variable length wheelbase;
a main body;
a pair of rear wheels configured to move forward and rearward relative to the main body;
a rear axle bar mounted on a longitudinal member protruding rearward from the main body, wherein the pair of rear wheels is mounted on the rear axle bar, wherein the longitudinal member is fixedly mounted on a suspension element;
a wheelbase extension actuator configured to control the forward and rearward movement of the rear axle bar along the longitudinal member, wherein the actuator is mounted above the longitudinal member; and
a pitch control actuator configured to pivot the suspension element up and down relative to the main body to alter a pitch measurement of the main body, wherein when the pitch control actuator is extended to its fullest to alter the pitch measurement, activation of the wheelbase extension actuator results in further pivoting of the suspension element to further alter the pitch measurement of the main body.

7. The combine harvester of claim 6, wherein the wheelbase extension actuator is fixed to at least one of a first end or a second end by a spherical joint.

8. The combine harvester of claim 1, wherein the suspension element is joined to a chassis of the combine harvester by at least one swing arm.

9. The combine harvester of claim 1
wherein the main body defines a forward end and a rear end; further comprising:
a feeder house at the forward end of the main body; and
a first set of ground-engaging elements supporting the forward end of the main body.

* * * * *